(12) United States Patent
Il'in et al.

(10) Patent No.: US 11,883,886 B2
(45) Date of Patent: Jan. 30, 2024

(54) DEVICE FOR HOLES AND TREPANS CUTTING

(71) Applicants: JOINT STOCK COMPANY "ROSENERGOATOM", Moscow (RU); NATIONAL RESEARCH CENTRE "KURCHATOV INSTITUTE", Moscow (RU); LIMITED LIABILITY COMPANY NAUCHNO-PROIZVODSTVENNAYA FIRMA "TERMIKS", Moscow (RU); SCIENCE AND INNOVATIONS—NUCLEAR INDUSTRY SCIENTIFIC DEVELOPMENT, PRIVATE ENTERPRISE, Moscow (RU)

(72) Inventors: Sergei Vladimirovich Il'in, Moscow (RU); Evgenii Vitalevich Luchinskii, pos. Kolodeznyi (RU); Vladimir Yudevich Sandler, Moscow (RU)

(73) Assignees: NATIONAL RESEARCH CENTRE "KURCHATOV INSTITUTE", Moscow (RU); LIMITED LIABILITY COMPANY NAUCHNO—PROIZVODSTVENNAYA FIRMA "TERMIKS", Moscow (RU); SCIENCE AND INNOVATIONS—NUCLEAR INDUSTRY SCIENTIFIC DEVELOPMENT, PRIVATE ENTERPRISE, Moscow (RU)

( * ) Notice: Subject to any disclaimer, the term of this patent is extended or adjusted under 35 U.S.C. 154(b) by 0 days.

(21) Appl. No.: 17/257,286

(22) PCT Filed: Dec. 30, 2019

(86) PCT No.: PCT/RU2019/001055
§ 371 (c)(1),
(2) Date: Dec. 30, 2020

(87) PCT Pub. No.: WO2021/020991
PCT Pub. Date: Feb. 4, 2021

(65) Prior Publication Data
US 2022/0143716 A1    May 12, 2022

(30) Foreign Application Priority Data
Aug. 1, 2019    (RU) ............................... 2019124496

(51) Int. Cl.
*B23B 39/14*    (2006.01)
*B23B 51/04*    (2006.01)
*G21C 21/00*    (2006.01)

(52) U.S. Cl.
CPC ............. *B23B 39/14* (2013.01); *B23B 51/04* (2013.01); *B23B 51/0453* (2013.01); *G21C 21/00* (2013.01)

(58) Field of Classification Search
CPC ......... B23B 39/10; B23B 39/12; B23B 39/14; B23B 35/00; B23B 51/04; B23B 5/0453;
(Continued)

(56) References Cited

U.S. PATENT DOCUMENTS

2015/0003927 A1*  1/2015  Spishak ............... G05B 19/182
408/1 R

FOREIGN PATENT DOCUMENTS

KR    100671021 B1 *  1/2007
RU    2504851 C1 *  1/2014

OTHER PUBLICATIONS

RU 2504851 Machine Translation Jan. 20, 2014 (Year: 2014).*
KR 100671021 Machine Translation Jan. 19, 2007 (Year: 2007).*

* cited by examiner

*Primary Examiner* — Alan Snyder
*Assistant Examiner* — Joshua S Hearne

(74) *Attorney, Agent, or Firm* — J. Miguel Hernandez; James R. Gourley; Carstens, Allen & Gourley, LLP

(57) ABSTRACT

Device for holes and trepans cutting containing a movable platform, a mechanism of rotation and feeding of the cutting tool installed on the platform, a box-shaped repair cabin with a through hole in a vertical wall thereof and, accommodating a positioning sleeve with an inner flange facing the inside of the repair cabin and an outer flange fixed outside the repair cabin. A mounting fixture secured on the inner flange of the positioning sleeve comprises a mounting plate fixed on the inner flange of the positioning sleeve. A rotating positioning plate is pivotally installed on the mounting plate. The mounting plate and the rotating positioning plate are provided with a mechanism for fixing in the closed position. The movable platform is provided with height-adjustable rotatable wheel supports. A catcher is fixed on the outer flange of the positioning sleeve for primary storage of cut trepans and collection of chips.

4 Claims, 12 Drawing Sheets

Figure 1:
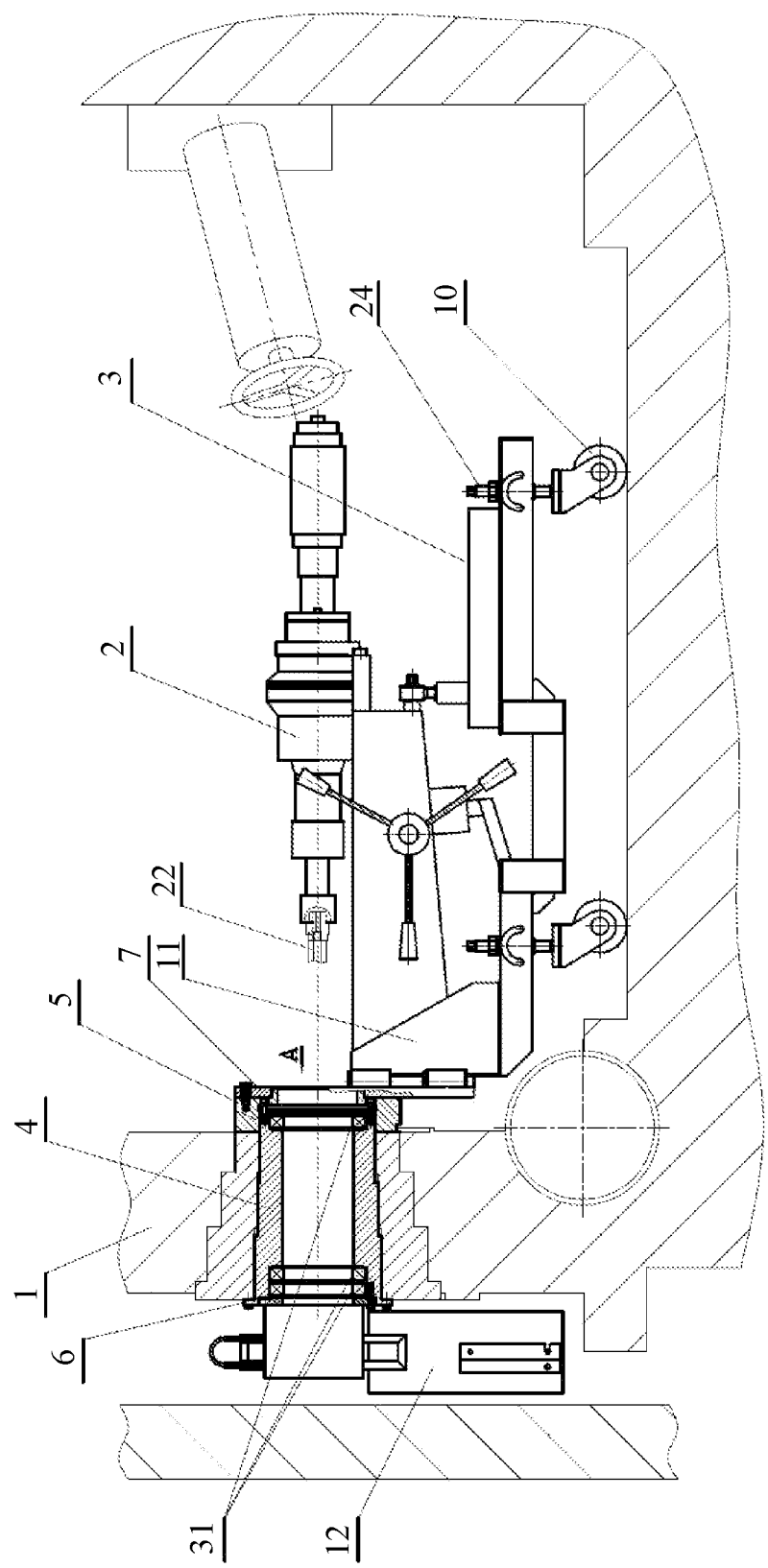

(58) Field of Classification Search
CPC ........ B23B 41/10; G21C 21/00; G21C 19/00; B23Q 11/0042; B23Q 11/0067; B23Q 11/0053
See application file for complete search history.

DEVICE FOR HOLES AND TREPANS CUTTING

CROSS-REFERENCE TO RELATED DISCLOSURE

This application is a U.S. National Stage of International Application No. PCT/RU2019/001055, filed on Dec. 30, 2019, titled "Device for Holes and Trepans Cutting," which claims priority to RU 2019124496 filed on Aug. 1, 2019. Each application, publication, and patent listed in this paragraph are hereby incorporated by reference in their entireties.

The invention relates to the field of mechanical engineering, namely to process equipment, mainly for nuclear power industry, and more specifically, to devices for performing process operations for cutting holes and (or) through cylindrical samples from the vessel of a nuclear reactor, referred to as trepans in nuclear power industry (History of Nuclear Power of the Soviet Union and Russia. Issue 2/V. A. Sidorenko.-M.: IzdAT, 2002.-432 pp. p. 211.)

There is a known machine for cutting caissons with defective irradiated fuel assemblies (SFA) (RF patent No. 2504851), containing mechanisms for rotating the cutting tool and longitudinal feed, as well as a movable platform and a horizontal feed mechanism. The known technical solution does not allow cutting holes (trepans) inside the nuclear reactor vessel, given the limited space of the repair cabin.

The objective of the present invention is to ensure the convenience and safety of work when performing process operations for cutting trepans in the reactor vessel at one workplace in a limited space of the repair cabin.

The technical result achieved by the proposed invention is to ensure the accuracy of the alignment of the cutting tool and reduce the cutting tool installation time and, as a result, reduce the radiation exposure loads on the service personnel.

This technical result is achieved due to the fact that the device for holes and trepans cutting containing a mechanism of rotation and feeding of the cutting tool and a movable platform is, according to the present invention, further provided with a box-shaped repair cabin performing the role of a device body, with a through hole made in a vertical wall of the repair cabin, the said hole accommodating a positioning sleeve mounted with an inner flange facing the inside of the repair cabin and an outer flange fixed outside the repair cabin, with a mounting fixture secured on the inner flange of the positioning sleeve, where the said mounting fixture comprises a mounting plate fixed on the inner flange of the positioning sleeve and a rotating positioning plate pivotally installed on the mounting plate with a possibility of rotating around the vertical axis, where the mounting plate and the rotating positioning plate are provided with a mechanism for fixing in the closed position, the movable platform is provided with height-adjustable rotatable wheel supports installed inside on the bottom of the repair cab and rigidly attached to the gusset of the rotating positioning plate, the mechanism of rotation and feeding of the cutting tool is installed on the movable platform with the mounting and rotating positioning plates being in the closed position coaxially with the positioning sleeve, and a catcher is fixed on the outer flange of the positioning sleeve for primary storage of cut trepans and collection of chips.

Preferably, the movable platform of the device for holes and trepans cutting is a spatial truss with height-adjustable rotatable wheel supports.

The device for holes and trepans cutting may be provided with a fixture for branding trepans before cutting the same, including a hollow cylindrical body, end covers installed at the ends of the cylindrical body having groove holes made on them along the diameter line, connected to each other in pairs on different end covers by through guide tubes placed inside the cylindrical body, a rod for branding trepans placed in one of the guide tubes, with a removable striker at one end and a digital stamp on the other, and removable plugs installed in the other guide tubes, where the outer surface of the cylindrical body is made according to the running fit for installation inside the positioning sleeve, and the space inside the cylindrical body between the guide tubes is filled with lead shot to a part of the length of the cylindrical body.

The device for holes and trepans cutting is preferably provided with a lead safety plug installed in the positioning sleeve from the end facing the inside of the repair cabin.

The mechanism of rotation and feeding of the cutting tool of the device for holes and trepans cutting may be implemented in the form of a drilling machine, preferably pneumatic, and the cutting tool is implemented in the form of a core drill.

A drilling fixture of the device for holes and trepans cutting may be made in the form of a hollow cylinder provided with end caps installed at its ends, with central holes made in them, interconnected by a hollow tube configured to accommodate an ejector and to supply a cooling fluid to the cutting tool, where one of the end caps has a mounting bore for installing the cutting tool, and the other end cap is configured to be installed and fixed in the chuck of the drilling machine.

The proposed technical solution—a device for holes and trepans cutting—is explained by an example of specific implementation described below. The example presented is not the only possible one, but clearly demonstrates the possibility of achieving the claimed technical result with the given totality of essential features of the invention.

Figure 2:
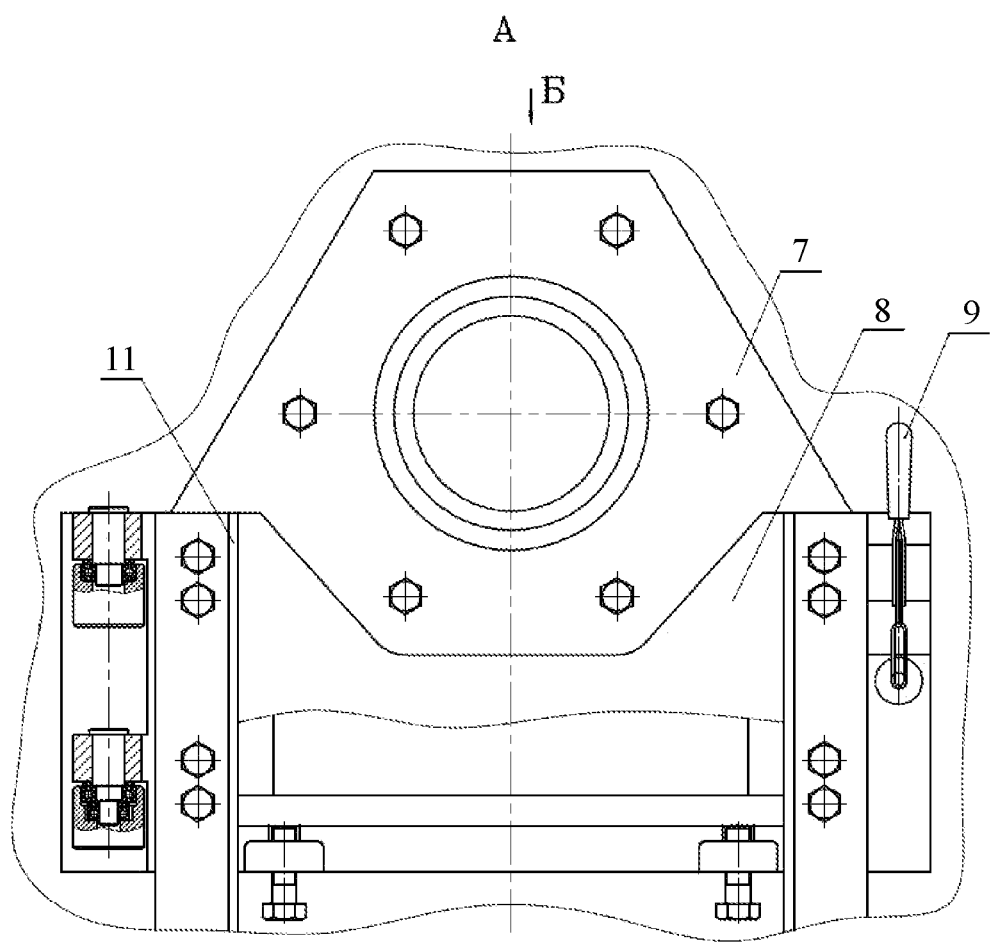
Figure 3:
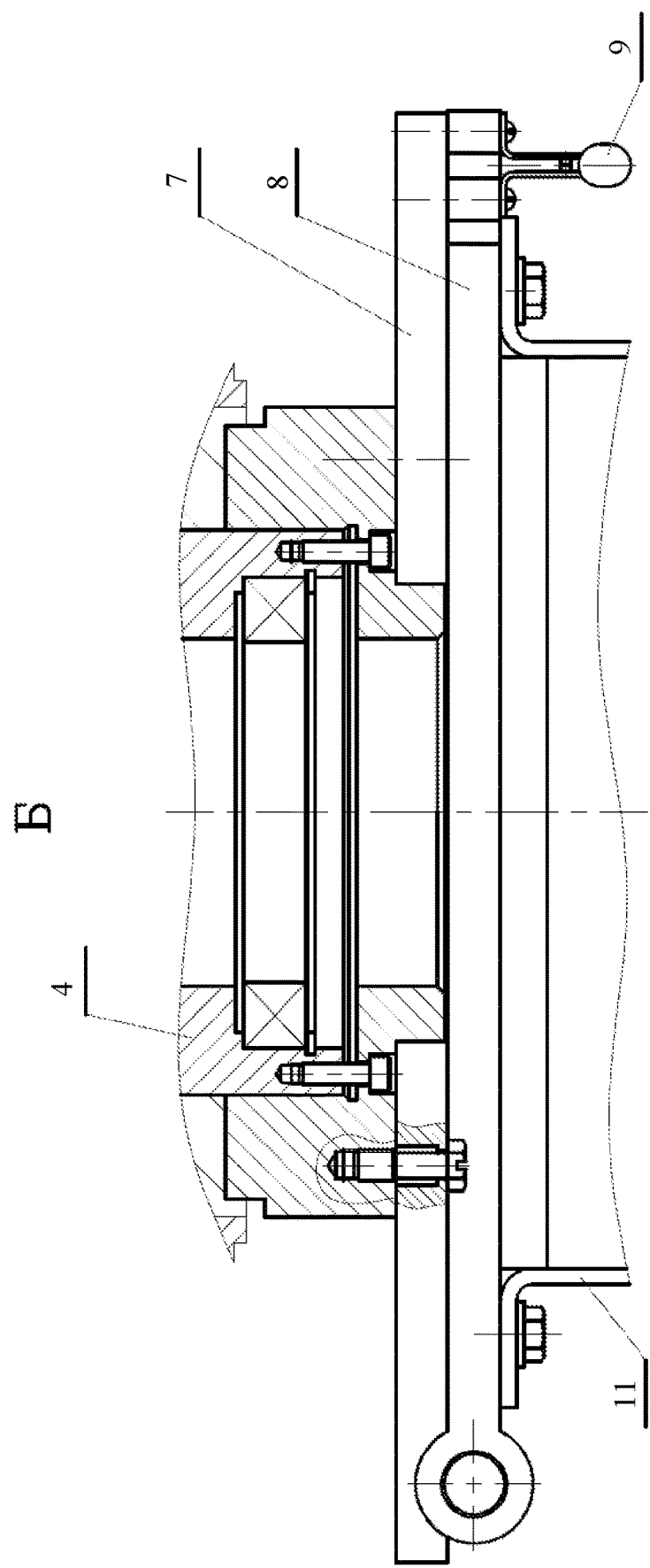
Figure 4:
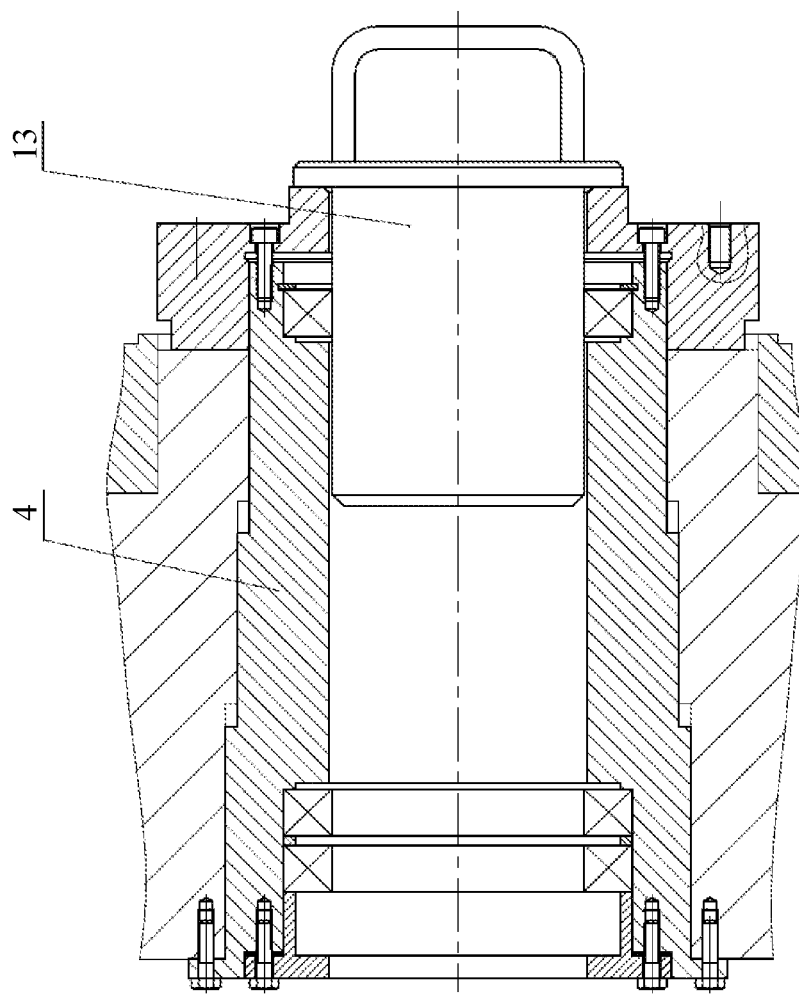
Figure 5:
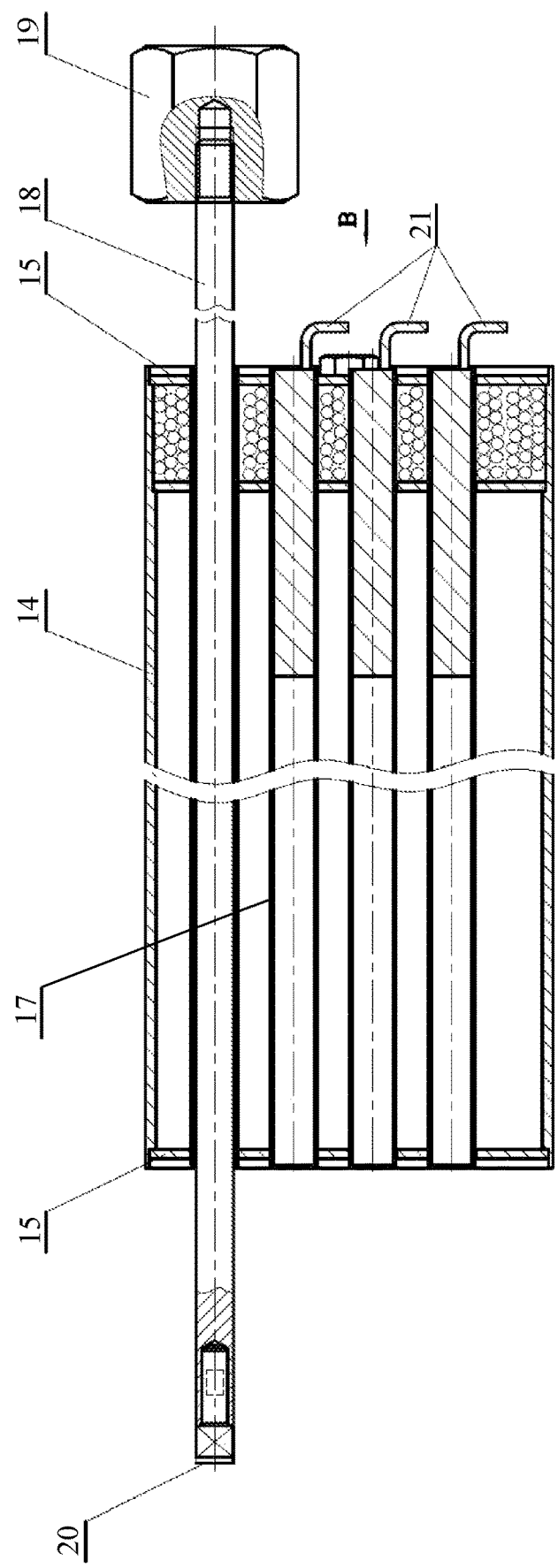
Figure 6:
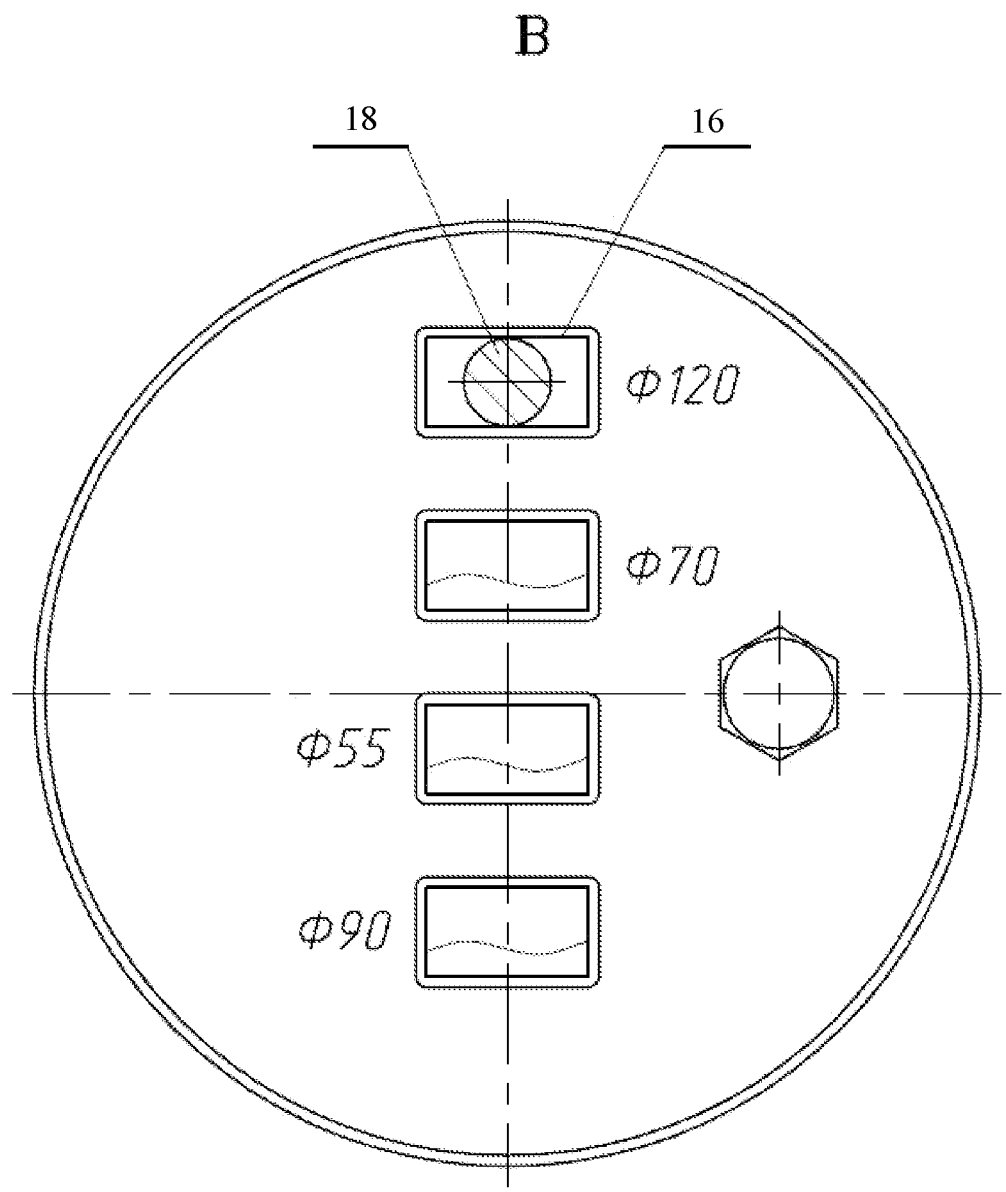
Figure 7:
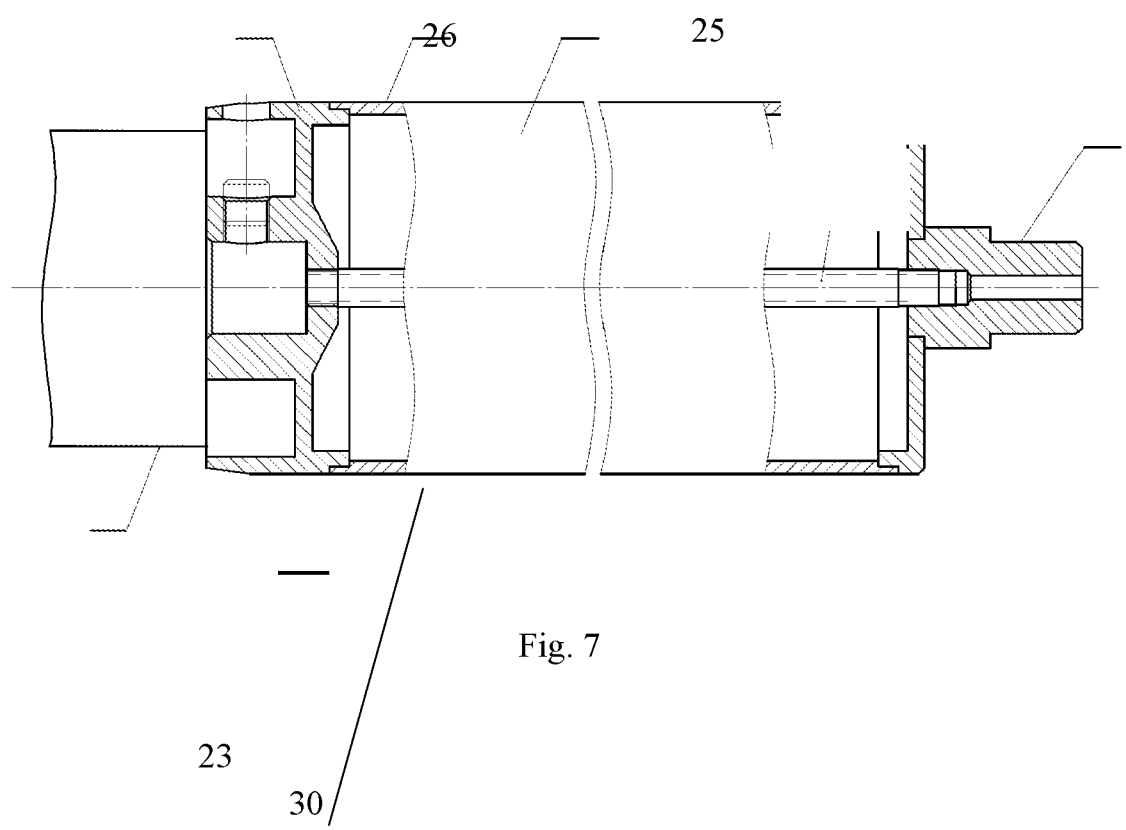
Figure 8:
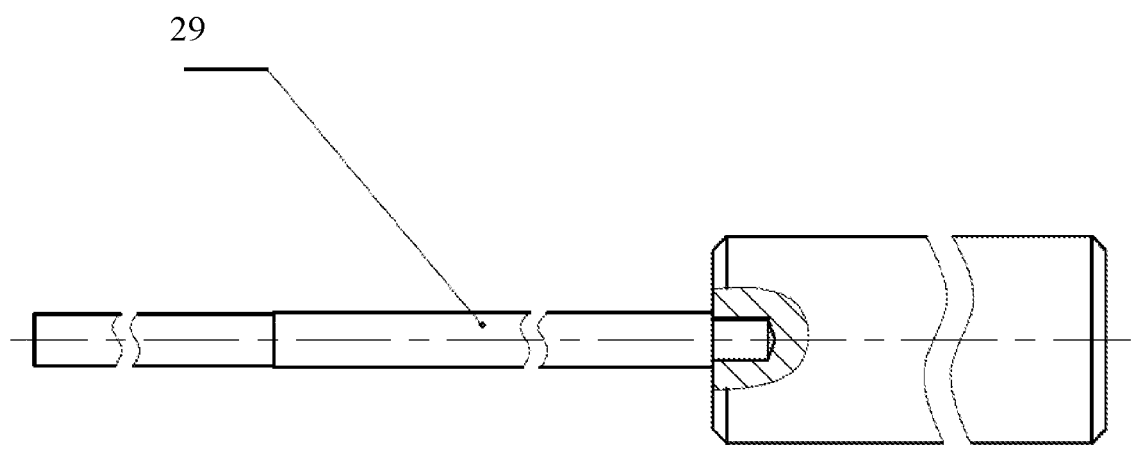

The essence of the invention is explained by the following graphic materials. FIG. 1 is a longitudinal section of the device for holes and trepans cutting located in the repair cab, FIGS. 2 and 3 show the positioning plate, FIG. 4 shows the diagram for installation of the safety plug, FIGS. 5 and 6 show a diagram of the branding fixture, FIG. 7 shows the design of the drilling fixture, FIG. 8 shows the design of the ejector, FIGS. 9-12 show a diagram of the installation and setup of the device for cutting holes and trepans inside the repair cabin.

The device for holes and trepans cutting is provided with box-shaped repair cabin 1 that performs the role of the device body. The device for holes and trepans cutting is installed inside repair cabin 1 and contains mechanism 2 for rotating and feeding the cutting tool and movable platform 3.

A through hole is made in a vertical wall of repair cabin 1, in which positioning sleeve 4 is installed with inner flange 5 and outer flange 6.

A mounting fixture is secured on inner flange 5 of positioning sleeve 4, where the said mounting fixture comprises mounting plate 7 fixed on inner flange 5 of positioning sleeve 4 and rotating positioning plate 8 pivotally installed on mounting plate 7 with a possibility of rotating around the vertical axis. Mounting plate 7 and rotating positioning plate 8 are provided with mechanism 9 for fixing the same in the closed position.

Movable platform 3 is a spatial truss provided with height-adjustable rotatable wheel supports 10, two of which have brakes. Movable platform 3 is installed inside repair cabin 1 on the bottom. For adjustment, re-installation of devices and for operation of the device in a limited space, mobile platform 3 is rigidly attached to gusset 11 of rotating positioning plate 8, and mechanism 2 of rotation and feeding of the cutting tool with a carriage is installed on movable platform 3. When mounting plate 7 and rotary positioning plate 8 are closed, mechanism 2 for rotating and feeding the cutting tool must be coaxially aligned with positioning sleeve 4.

Catcher 12 is fixed on outer flange 6 of positioning sleeve 4 for primary storage of cut trepans and collection of chips.

For the time of the installation of movable platform 3 and the preparatory operations preceding the branding and cutting of trepans, the bore of positioning sleeve 4 is blocked with lead safety plug 13 from the end facing the inside of repair cabin 1.

The method of installing safety plug 13 is shown in FIG. 4.

The device for holes and trepans cutting may be provided with a fixture for branding trepans before cutting the same. The fixture for branding comprises hollow cylindrical body 14, end covers 15 installed at the ends of cylindrical body 14, having groove holes 16 made on them along the diameter line. Groove holes 16 on different end covers 15 are interconnected in pairs with through guide tubes 17 arranged inside cylindrical body 14. Rod 18 for branding trepans is placed in one of the guide tubes, with removable striker 19 at one end of rod 18 and digital stamp 20 on its other end. Removable plugs 21 are installed in the other guide tubes 17. The outer surface of cylindrical body 14 is made according to the running fit for installation inside positioning sleeve 4, and the space inside cylindrical body 14 between guide tubes 17 is filled with lead shot to a part of the length of cylindrical body 14, the lead shot reducing the radiation exposure loads on the service personnel.

Mechanism 2 for rotating and feeding the cutting tool is made in the form of a pneumatic drilling machine, for example, that of make PRO-200A, and contains a chuck, drilling fixture 22 and cutting tool 23 made in the form of a core drill. The axis of the horizontally located mechanism 2 for rotating and feeding the cutting tool coincides with the axes of the mounting fixture and positioning sleeve 4. The height adjustment of the machine axis is carried out with screws 24 of wheel supports 10.

Drilling fixture 22 is made in the form of hollow cylinder 25 provided with end caps 26 and 27 installed at its ends. End caps 26 and 27 have central holes made in them, which are interconnected by hollow tube 28 configured to accommodate ejector 29 and to supply a cooling fluid to cutting tool 23. Here, one of end caps 26 has mounting bore 30 for installing cutting tool 23, and other end cap 27 is configured to be installed and fixed in the chuck of mechanism 2 of rotation and feeding of the cutting tool. The outer surface of hollow cylinder 25 installed in bearing supports 31 of positioning sleeve 4 is machined according to the running fit. A lubricating and cooling liquid is supplied through tube 28 to the inner cavity of cutting tool 23 (core drill) in the course of cutting a trepan. After the trepan is cut out, ejector 29 rod is installed in same tube 28. With a help of ejector 29, the trepan cut out is pushed off from the core drill cavity into the receptacle of catcher 12, the volume of which can accommodate up to 4 pieces of cut out trepans.

The procedure for working with the device for holes and trepans cutting is as follows.

Positioning sleeve 4 is mounted into a wall of repair cabin located in a room for maintenance of the same, with catcher 12 attached to said sleeve from outside, and mounting fixture from inside.

Mechanism 2 for rotating and feeding the cutting tool (drilling machine) is installed on movable platform 3. Movable platform 3, together with mechanism 2 for rotating and feeding the cutting tool, is installed on the bottom (floor) of repair cabin 1 and is connected to the mounting fixture with bolts. All the fixtures are located here, as well.

Figure 9:
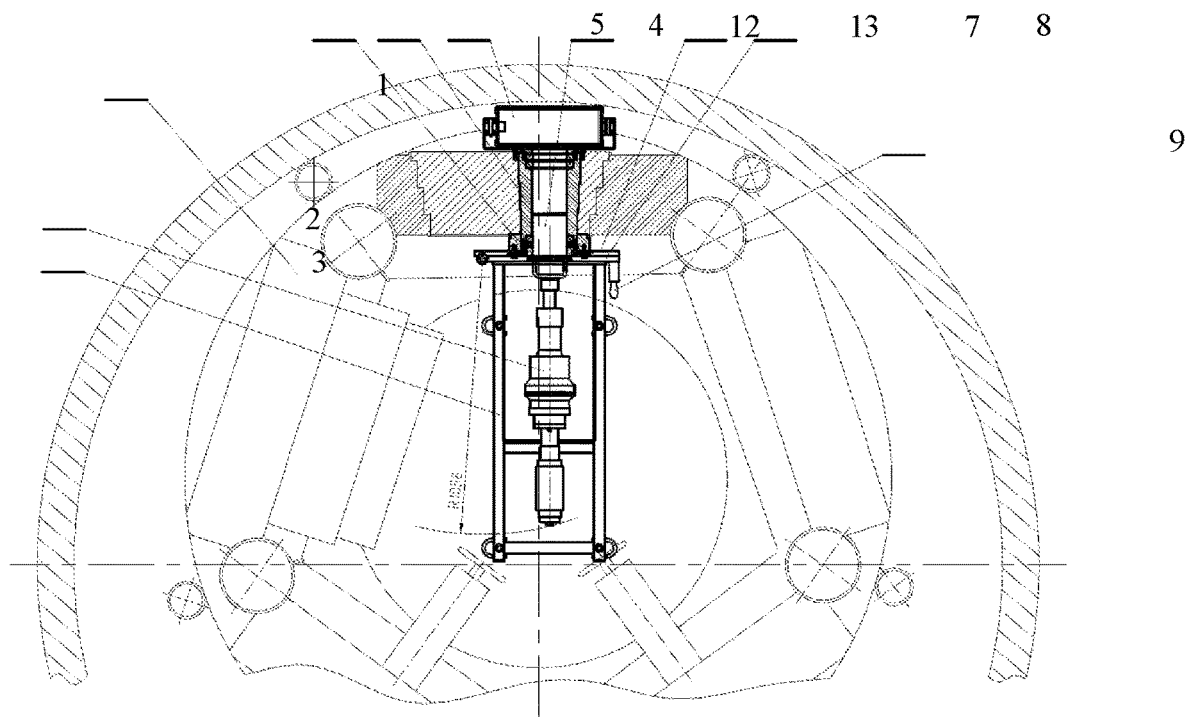

The carriage of mechanism 2 of rotation and feeding of the cutting tool is shifted horizontally to a position providing the necessary clearance between the rear end of the spindle of mechanism 2 of rotation and feeding of the cutting tool and repair cab 1 elements protruding inside at rotation of movable platform 3, as shown in FIG. 9.

Repair cabin 1 with installed equipment is moved inside the reactor vessel to the location for performing process operations for cutting a hole (trepan).

Figure 10:
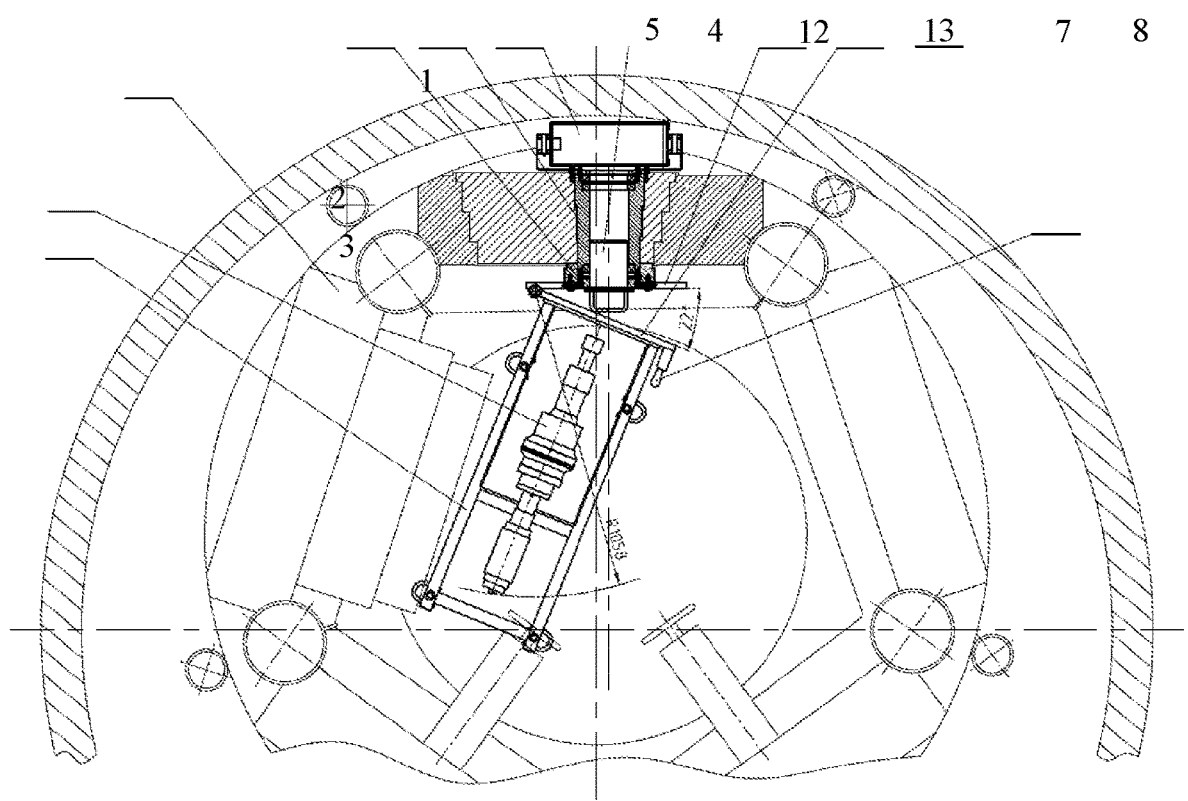
Figure 11:
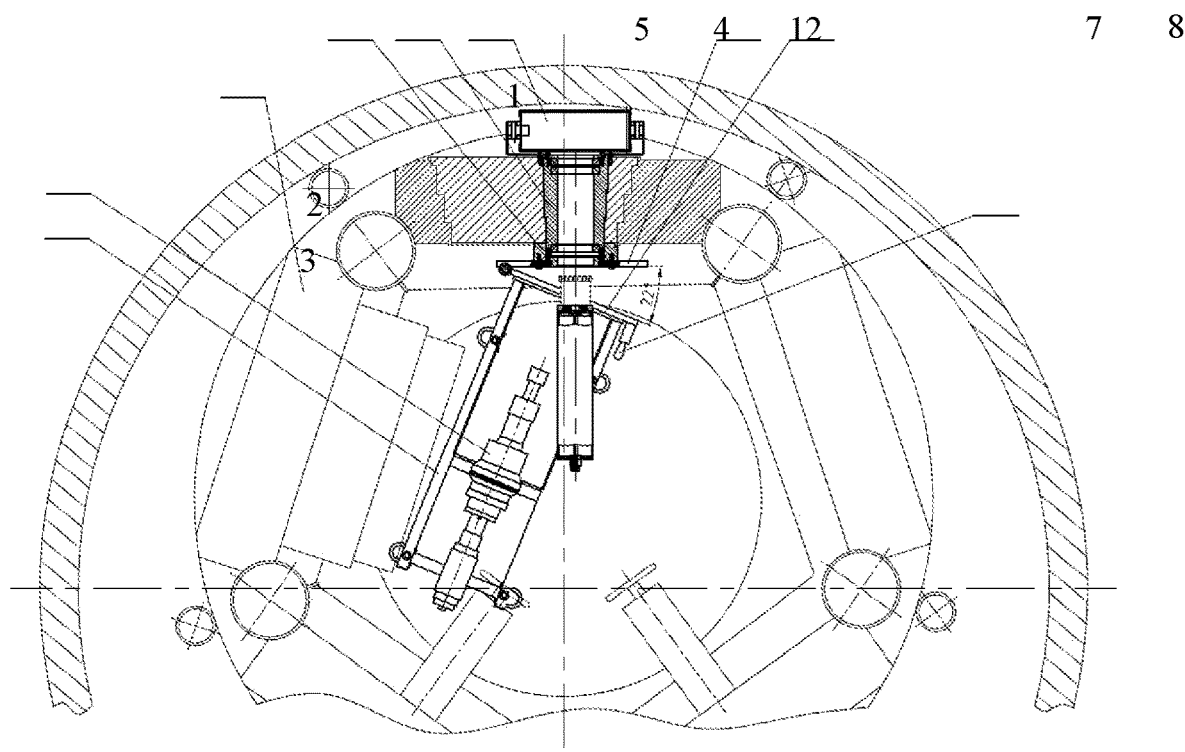

Mechanism 9 for fixing mounting plate 7 and rotary positioning plate 8 in the closed position is released. Movable platform 3 is rotated by an angle of 22°±2°, and its position is fixed by brakes of wheel supports 10, as shown in FIG. 10.

The carriage of mechanism 2 rotation and feeding of the cutting tool is moved horizontally (FIG. 11), providing access to the bore of positioning 4 for installation of a branding fixture and drilling fixture 22, and (after completion of cutting holes (trepans)—for installation of a sealing plug.

Lead safety plug 13 is removed, and the branding device is installed into inner bearing supports 31 of positioning sleeve 4. Rod 18 for branding with digital stamp 20 at the end is installed into groove hole 16 corresponding to the diameter of trepan to be cut out, and a stamp is applied to the surface of the wall of the reactor vessel by an impact method.

Figure 12:
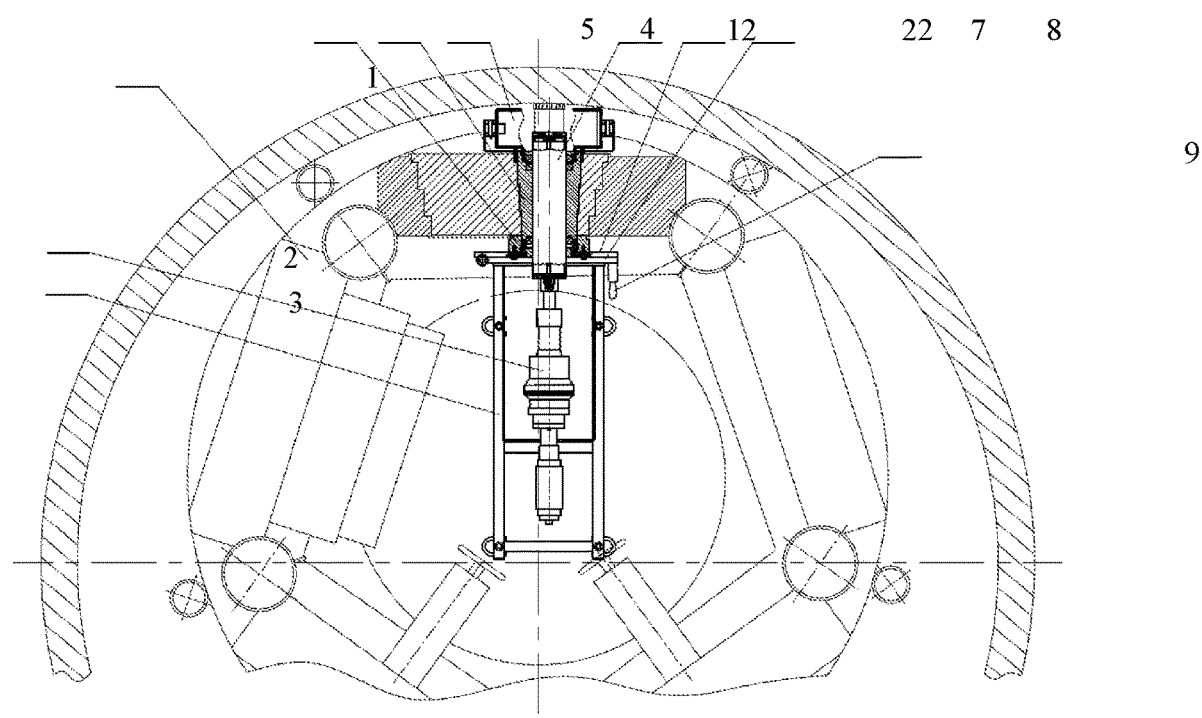

The branding fixture is removed and drilling fixture 22 is installed in its place on inner bearing supports 31, in which cutting tool 23 (core drill) is fixed for cutting out a trepan of the required diameter. Drilling device 22 is moved horizontally along inner bearing supports 31 of positioning sleeve 4 until it stops against the wall of the reactor vessel (FIG. 12).

Movable platform 3 is released off the brakes and returned to its initial position. Mechanism 9 for fixing mounting plate 7 and rotary positioning plate 8 of the mounting fixture secures them in the closed position, and wheel supports 10 are re-installed on the brake.

End cap 27 of drilling fixture 22 is fixed in the chuck of mechanism 2 for rotation and feeding the cutting tool.

Cooling fluid is supplied into the inner cavity of cutting tool 23 through hollow tube 28, mechanism 2 for rotation and feeding of the cutting tool is actuated, and, according to a dimensional scale on the carriage of mechanism 2 of rotation and feeding of the cutting tool, drilling is performed, with cutting tool 23 periodically extracted from the drilling area for removal of chips. Chips are collected into catcher 12.

Upon the completion of drilling, the chuck of mechanism 2 for rotation and feeding the cutting tool and end cap 27 of drilling fixture 22 are uncoupled, mechanism 9 for fixing mounting plate 7 and rotating positioning plate 8 is released, wheel supports 10 are removed off the brakes, and movable platform 3 is moved to a position that allows working with ejector 29 and the device for installing the sealing plug. Wheel supports 10 are installed on the brakes.

The cylinder of drilling fixture 22 is moved inside repair cabin 1 so that cutting tool 23 is located above catcher 12, and, with ejector 29, the cut-out trepan is pushed off through hollow tube 28 of drilling fixture 22 into catcher 12. The process of cutting a trepan out of the wall of the reactor vessel is complete.

Drilling device 22 is removed, and a plug-mounting fixture is installed in its place, along with a plug of an appropriate diameter. Manipulations are carried out to install the plug and terminate the hole.

Upon completion of operations for installing the plug into the drilled hole, the plug-mounting fixture is withdrawn and replaced with safety plug 13. The process cycle of branding, drilling, storage of drilled out trepan and terminating the cut hole with a plug from one workplace is complete. The repair cabin is ready for the next process cycle of cutting a trepan in the next place under study without removing the chamber itself out of the volume of the reactor vessel.

The use of the proposed device will ensure the accuracy of the alignment of the cutting tool, reduce the cutting tool installation and, as a result, reduce the radiation exposure loads on the service personnel, as well as the convenience of work during the process operations for branding, cutting and initial storage of cut-out trepans, terminating the cut hole with a plug at one workplace in a limited space.

What is claimed is:

1. A device for cutting holes and trepans comprising a mechanism for cutting tool rotation and feeding, and a movable platform, as well as a box-shaped repair cabin as a body of the device,
   wherein a through hole is made in a vertical wall of the repair cabin,
   a positioning sleeve is installed in the through hole with an inner flange facing inside the repair cabin and an outer flange fixed outside the repair cabin,
   a mounting attachment is fixed on the inner flange of the positioning sleeve,
   the mounting attachment includes a mounting plate fixed on the inner flange of a positioning sleeve,
   a rotating positioning plate is hinged on the mounting plate with a possibility of rotation around a vertical axis,
   the mounting plate and positioning plate are configured to be in a locked position,
   a movable platform is equipped with height-adjustable rotary wheel supports,
   the movable platform is installed on a bottom of the repair cabin and rigidly attached to a gusset plate of the rotating positioning plate,
   the mechanism for cutting tool rotation and feeding is installed on the movable platform coaxially relative to the positioning sleeve, wherein the mounting positioning plate and rotating positioning plate are in the locked position,
   a catcher is fixed on the outer flange of the positioning sleeve for the primary storage of cut trepans and collection of chips,
   a device for affixing stamps on trepans before cutting the trepans,
   the device for affixing stamps on trepans comprises a hollow cylindrical body, end caps installed on ends of the cylindrical body,
   the end caps have hole grooves along the diameter line of the caps,
   the hole grooves are connected through guide tubes to each other in pairs, on different end caps placed inside the cylindrical body,
   a rod for affixing stamps on trepans is arranged in one of the guide tubes,
   the rod for affixing stamps on trepans has a removable striker on one end of the rod for affixing stamps on trepans and a digital stamp on other end of the rod for affixing stamps on trepans,
   removable plugs are installed in other guide tubes,
   wherein an outer surface of the cylindrical body is configured to be installed inside of the positioning sleeve,
   wherein space inside the cylindrical body between the guide tubes is filled with lead pellets at least to a part of the cylindrical body length.

2. The device according to claim 1, equipped with a lead safety plug; the lead safety plug is installed in the positioning sleeve on the end facing inside the repair cabin.

3. The device according to claim 1, wherein the mounting plate and positioning plate include a pneumatic drilling machine, the pneumatic drilling machine comprises a drilling fixture and a cutting tool made as a core drill.

4. The device according to claim 1, where the drilling fixture is made as a hollow cylinder provided with end caps installed on its ends, the end caps have central holes interconnected by a hollow tube; the hollow tube can accommodate an ejector and supply a coolant to the cutting tool, wherein one of the end caps has a mounting bore for the installation of the cutting tool, and the other end cap is configured to be installed and fixed in a chuck of a drilling machine.

* * * * *

UNITED STATES PATENT AND TRADEMARK OFFICE
CERTIFICATE OF CORRECTION

PATENT NO. : 11,883,886 B2
APPLICATION NO. : 17/257286
DATED : January 30, 2024
INVENTOR(S) : Sergei Vladimirovich Il'in, Evgenii Vitalevich Luchinskii and Vladimir Yudevich Sandler Page 1 of 1

It is certified that error appears in the above-identified patent and that said Letters Patent is hereby corrected as shown below:

On the Title Page

(73) Assignees should read: JOINT STOCK COMPANY "ROSENERGOATOM", Moscow (RU);
NATIONAL RESEARCH CENTRE "KURCHATOV INSTITUTE", Moscow (RU);
LIMITED LIABILITY COMPANY NAUCHNO- PROIZVODSTVENNAYA FIRMA "TERMIKS", Moscow (RU);
SCIENCE AND INNOVATIONS -NUCLEAR INDUSTRY SCIENTIFIC DEVELOPMENT, PRIVATE ENTERPRISE, Moscow (RU)

Signed and Sealed this
Twenty-first Day of October, 2025

John A. Squires
*Director of the United States Patent and Trademark Office*